United States Patent
Sujan et al.

(10) Patent No.: US 11,835,351 B2
(45) Date of Patent: Dec. 5, 2023

(54) OPTIMAL ROUTE PLANNING FOR ELECTRIC VEHICLES

(71) Applicant: Cummins Inc., Columbus, IN (US)

(72) Inventors: Vivek A. Sujan, Columbus, IN (US); David J. Langenderfer, Columbus, IN (US)

(73) Assignee: CUMMINS INC., Columbus, IN (US)

( * ) Notice: Subject to any disclaimer, the term of this patent is extended or adjusted under 35 U.S.C. 154(b) by 0 days.

(21) Appl. No.: 16/916,826

(22) Filed: Jun. 30, 2020

(65) Prior Publication Data

US 2021/0018324 A1 Jan. 21, 2021

Related U.S. Application Data

(60) Provisional application No. 62/875,675, filed on Jul. 18, 2019.

(51) Int. Cl.
*G01C 21/34* (2006.01)
*G01C 21/36* (2006.01)

(52) U.S. Cl.
CPC ..... *G01C 21/3469* (2013.01); *G01C 21/3492* (2013.01); *G01C 21/3694* (2013.01); *G01C 21/3697* (2013.01)

(58) Field of Classification Search
None
See application file for complete search history.

(56) References Cited

U.S. PATENT DOCUMENTS

| | | | |
|---|---|---|---|
| 6,483,198 B2 | 11/2002 | Schmitz | |
| 9,108,503 B2 | 8/2015 | Wang | |
| 9,211,804 B2 | 12/2015 | Preece | |
| 2004/0243305 A1* | 12/2004 | Kozak | G01C 21/3461 701/533 |
| 2009/0063032 A1* | 3/2009 | Das | G01C 21/00 701/533 |
| 2010/0114472 A1* | 5/2010 | Oumi | G01C 21/3476 701/532 |
| 2011/0238457 A1* | 9/2011 | Mason | G01C 21/3469 705/7.14 |

(Continued)

FOREIGN PATENT DOCUMENTS

| | | | |
|---|---|---|---|
| CN | 105675002 A | * | 6/2016 |
| WO | 2012097349 A2 | | 7/2012 |
| WO | 2018091303 A1 | | 5/2018 |

OTHER PUBLICATIONS

Zhao, Translation of CN105675002A, Jun. 2016 (Year: 2016).*

*Primary Examiner* — Rachid Bendidi
*Assistant Examiner* — Selena M Jin
(74) *Attorney, Agent, or Firm* — Faegre Drinker Biddle & Reath LLP

(57) ABSTRACT

A method of route planning for an electric vehicle includes obtaining waypoint data that indicates waypoint locations for the electric vehicle. The method also includes generating a map and a plurality of route segments to connect each of the waypoint locations on the map. Further, the method includes calculating an optimal route for the electric vehicle to visit each of the waypoint locations by evaluating the plurality of route segments. In response to detecting changes occurring in conditions associated with each of the plurality of route segments, the method includes recalculating the optimal route for the electric vehicle.

20 Claims, 5 Drawing Sheets

(56) References Cited

U.S. PATENT DOCUMENTS

| | | | |
|---|---|---|---|
| 2015/0039223 A1* | 2/2015 | Ikeuchi | G01C 21/36 |
| | | | 701/461 |
| 2016/0363456 A1* | 12/2016 | Pujos | G08G 5/0017 |
| 2017/0370738 A1* | 12/2017 | Park | G01C 21/3415 |
| 2018/0170349 A1 | 6/2018 | Jobson | |
| 2019/0016329 A1 | 1/2019 | Park | |
| 2019/0316924 A1* | 10/2019 | Morgan-Brown | B60L 58/12 |
| 2020/0011690 A1* | 1/2020 | Becker | G01C 21/3679 |
| 2020/0122588 A1* | 4/2020 | Cserna | B60L 58/12 |
| 2020/0284599 A1* | 9/2020 | Cyr | G01C 21/3469 |
| 2020/0294394 A1* | 9/2020 | Guo | G08G 1/164 |

* cited by examiner

OPTIMAL ROUTE PLANNING FOR ELECTRIC VEHICLES

CROSS-REFERENCE TO RELATED APPLICATIONS

The present application claims priority to U.S. Provisional Patent Application No. 62/875,675, filed Jul. 18, 2019, and entitled "OPTIMAL ROUTE PLANNING FOR ELECTRIC VEHICLES," the entire disclosure of which is expressly incorporated by reference herein.

FIELD OF THE DISCLOSURE

The present disclosure generally relates to electric vehicles, and more particularly to methods and systems for optimizing route planning for electric vehicles.

BACKGROUND OF THE DISCLOSURE

Route optimization has applications in vehicle routing. For example, package delivery companies select routes for their vehicles to pick up and drop off packages at various destinations. The routes are optimized to maximize the number of deliveries or minimize the fuel consumption based on a multitude of factors such as a number of turns in a given route, a number of intersections, speed limits, bridge crossings, and the like. Most of these optimized routes, however, are computed in advance and therefore cannot respond to real-time circumstances that may affect the current operation.

For an emerging future, where electric vehicles are poised to replace vehicles powered by internal combustion engines, package delivery companies and other vehicle fleet operators will face additional challenges in route optimization including minimizing energy usage, exploiting charging opportunities, meeting zero emission zone (ZEZ) requirements in urban environments, etc. Without taking these considerations into account, any potential solution may result in increased costs (e.g., oversized batteries), limited charging strategies, and route plans that largely mimic those used by conventional vehicles. Accordingly, there remains a need to develop new approaches for optimizing route planning for electric vehicles.

SUMMARY

According to one embodiment, the present disclosure provides a method by a computing device for route planning for an electric vehicle. The method includes obtaining waypoint data indicating a plurality of waypoint or stopping locations for the electric vehicle. The method also includes generating a plurality of route segments to connect each of the plurality of waypoint locations on a map. The method further includes calculating an optimal route for the electric vehicle to visit each of the plurality of waypoint locations by evaluating the plurality of route segments. In response to detecting changes occurring in conditions associated with each of the plurality of route segments, the method includes recalculating the optimal route for the electric vehicle to visit each of the plurality of waypoint locations. Additionally, the method includes monitoring whether the conditions associated with each of the plurality of route segments have changed.

In a further aspect, calculating the optimal route by evaluating the plurality of route segments includes minimizing a total energy consumed by the electric vehicle to travel the plurality of route segments while completing the visit to each of the plurality of waypoint locations within a target time. Minimizing the total energy consumed by the electric vehicle includes determining a length, a road characteristic, and a speed limit for each of the plurality of route segments, where minimizing the total energy consumed by the electric vehicle to travel the length of each of the plurality of route segments is based on one or more dynamic operating characteristics of the electric vehicle, and the road characteristic and the speed limit for each of the plurality of route segments. Minimizing the total energy is further based on the conditions associated with each of the plurality of route segments including one or more of a road condition, a traffic condition, and a weather condition. Minimizing the total energy is further based on a state of the electric vehicle. The speed limit for each of the plurality of route segments is based on either a marked speed limit or an effective speed limit due to the road condition and/or the traffic condition.

In another aspect, generating the plurality of route segments to connect each of the plurality of waypoint locations is based on a prioritization of each of the plurality of waypoint locations, and recalculating the optimal route is further in response to a reprioritization of each of the plurality of waypoint locations.

In still another aspect, the map is generated to display the plurality of waypoint locations using the waypoint data and map data. The map data includes charging locations for the electric vehicle. As such, generating the plurality of route segments includes connecting each of the plurality of waypoint locations in view of the charging locations. Similarly, calculating the optimal route by evaluating the plurality of route segments includes minimizing a total energy consumed by the electric vehicle to travel the plurality of route segments while considering charging opportunities at the charging locations and completing the visit to each of the plurality of waypoint locations within a target time.

In yet another aspect, the map data includes ZEZ locations. As such, generating the plurality of route segments includes connecting each of the plurality of waypoint locations in view of the ZEZ locations. Similarly, calculating the optimal route by evaluating the plurality of route segments includes minimizing a total energy consumed by the electric vehicle to travel the plurality of route segments while considering requirements of traveling through the ZEZ locations and completing the visit to each of the plurality of waypoint locations within a target time. The requirements of traveling through the ZEZ locations include the priorities of the ZEZ locations, charging the electric vehicle prior to entering the ZEZ locations, and/or the emissions footprint created.

According to another embodiment, the present disclosure provides a computing device, such as a server, for route planning for an electric vehicle. The computing device includes a processor and a memory. The memory includes instructions that, when executed by the processor, cause the processor to obtain waypoint data indicating a plurality of waypoint locations for an electric vehicle. The processor also generates a plurality of route segments to connect each of the plurality of waypoint locations on a map. The processor further calculates an optimal route for the electric vehicle to visit each of the plurality of waypoint locations by evaluating the plurality of route segments. In response to detecting changes occurring in conditions associated with each of the plurality of route segments, the processor recalculates the optimal route for the electric vehicle to visit each of the plurality of waypoint locations. Additionally, the processor monitors whether the conditions associated with each of the plurality of route segments have changed.

In a further aspect, evaluating the plurality of route segments includes minimizing a total energy consumed by the electric vehicle to travel the plurality of route segments while completing the visit to each of the plurality of waypoint locations within a target time. Minimizing the total energy consumed by the electric vehicle includes determining a length, a road characteristic, and a speed limit for each of the plurality of route segments, where minimizing the total energy consumed by the electric vehicle to travel the length of each of the plurality of route segments is based on one or more dynamic operating characteristics of the electric vehicle, and the road characteristic and the speed limit for each of the plurality of route segments. Minimizing the total energy is further based on the conditions associated with each of the plurality of route segments including one or more of a road condition, a traffic condition, and a weather condition. Minimizing the total energy is further based on a state of the electric vehicle. The speed limit for each of the plurality of route segments is based on either a marked speed limit or an effective speed limit due to the road condition and/or the traffic condition.

In another aspect, the processor generates the plurality of route segments to connect each of the plurality of waypoint locations based on a prioritization of each of the plurality of waypoint locations and recalculates the optimal route in response to a reprioritization of each of the plurality of waypoint locations.

In still another aspect, the map is generated to display the plurality of waypoint locations using the waypoint data and map data. The map data includes charging locations for the electric vehicle. As such, the processor generates the plurality of route segments to connect each of the plurality of waypoint locations in view of the charging locations. Similarly, the processor calculates the optimal route by minimizing a total energy consumed by the electric vehicle to travel the plurality of route segments while considering charging opportunities at the charging locations and completing the visit to each of the plurality of waypoint locations within a target time.

In yet another aspect, the map data includes ZEZ locations. As such, the processor generates the plurality of route segments to connect each of the plurality of waypoint locations in view of the ZEZ locations. Similarly, the processor calculates the optimal route by minimizing a total energy consumed by the electric vehicle to travel the plurality of route segments while considering requirements of traveling through the ZEZ locations and completing the visit to each of the plurality of waypoint locations within a target time. The requirements of traveling through the ZEZ locations include the priorities of the ZEZ locations, charging the electric vehicle prior to entering the ZEZ locations, and/or the emissions footprint created.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION

Figure 1:
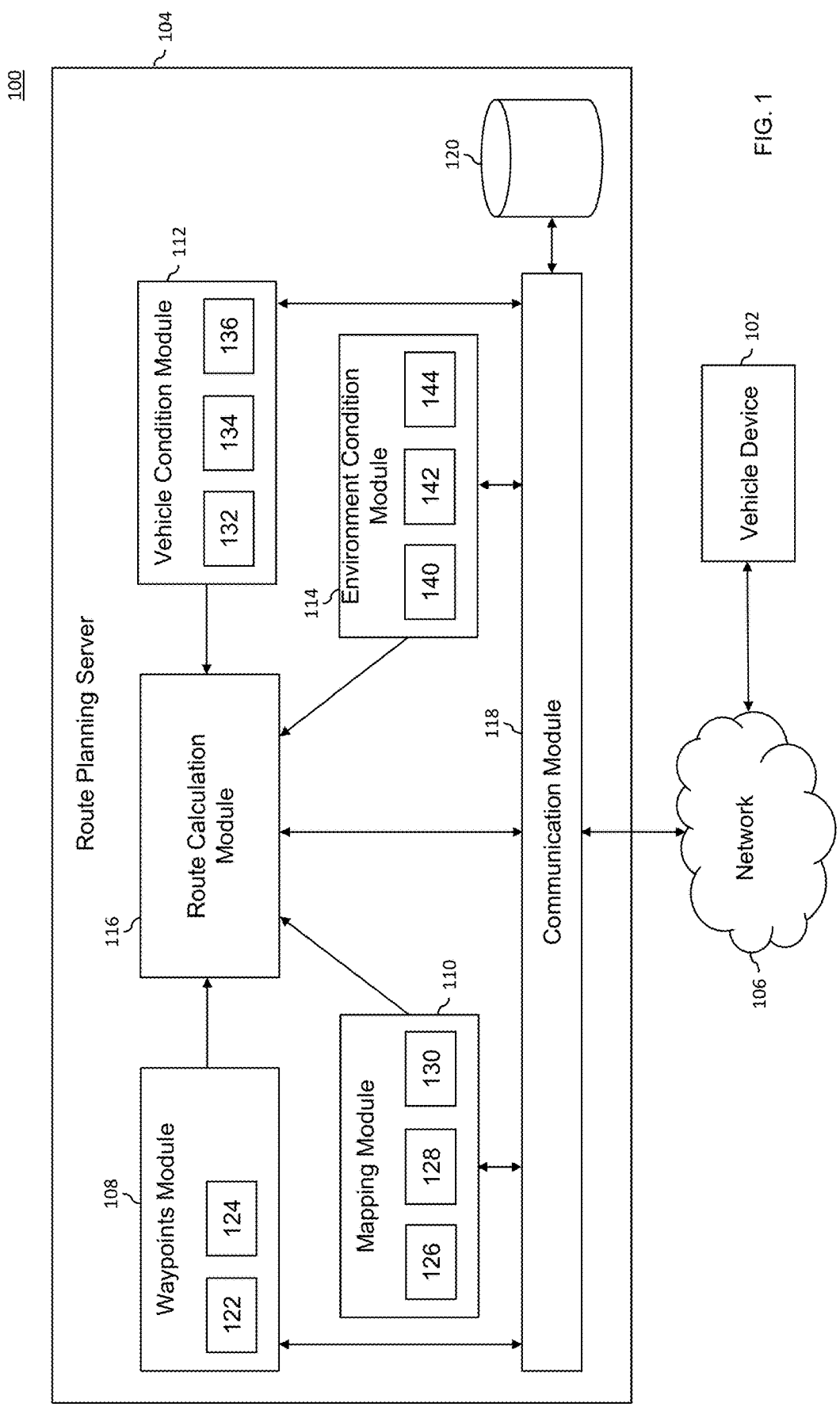
FIG. 1 is a block diagram illustrating a vehicle routing system.

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

One of ordinary skill in the art will realize that the embodiments provided can be implemented in hardware, software, firmware, and/or a combination thereof. Programming code according to the embodiments can be implemented in any viable programming language such as C, C++, HTML, XTML, JAVA or any other viable high-level programming language, or a combination of a high-level programming language and a lower level programming language.

Referring now to FIG. 1, a block diagram of a vehicle routing system 100 for an electric vehicle is shown, where a vehicle device 102 communicates with a route planning server 104 via a network 106. As used herein, the term "electric vehicle" may refer to pure electric vehicles, hybrid electric vehicles, and/or other alternative fuel vehicles that provide alternatives for either supplementing or completely replacing conventional fuel engine systems, such as internal combustion engines.

Vehicle device 102 can be any computing device associated with the electric vehicle that receives route information from route planning server 104 and performs navigation of the electric vehicle based on the route information. In one example, vehicle device 102 is an in-vehicle device (e.g., a navigation device) installed in the electric vehicle. In another example, vehicle device 102 is a user device (e.g., a mobile device) connected to the electric vehicle. While only one vehicle device 102 is shown in FIG. 1, it will be understood that route planning server 104 may communicate route information to any number of vehicle devices 102 associated with a fleet of electric vehicles.

Route planning server 104 operates to select routes for the electric vehicle that reduce energy use costs and improve operational efficiencies. Route planning server 104 can be implemented in one or more computing devices having processors that execute instructions stored in non-transitory memory. The computing devices can be physically co-located or geographically separate (e.g., located in different data centers). Route planning server 104 includes various components such as a waypoints module 108, a mapping module 110, a vehicle condition module 112, an environment condition module 114, a route calculation module 116, a communication module 118, and a data repository 120. Generally, these components can be implemented in hardware, software, firmware, or any suitable combination thereof.

Network 106 can be any suitable communication network such as a local area network (LAN), a wide area network (WAN), the Internet, and the like. For ease of illustration, only vehicle device 102 and route planning server 104 are depicted in FIG. 1. However, in various embodiments, vehicle routing system 100 may include additional components such as a fleet server that provides information on waypoints and assigns drivers to routes selected by route planning server 104, a mapping server/device that supplies worldwide map data, and/or other systems that provide information on road, traffic, and weather conditions. In one embodiment, route planning server 104 is part of or associated with a fleet server.

Waypoints module 108 is configured to obtain waypoint data 122. Waypoint data 122 may be provided by a fleet server, for example. Waypoint data 122 includes a plurality of waypoints or stopping points for the electric vehicle such as a starting location, an ending location, and one or more intermediate waypoint locations. Waypoint module 108 is also configured to obtain waypoint prioritization data 124, if available, that indicates which waypoint (or groups of waypoints) has a higher stopping priority and thus should be visited first or earlier than the other waypoints. Some or all of waypoint data 122 can be provided to mapping module 110 for use in generating maps.

Mapping module 110 is configured to obtain map data 126. Map data 126 may be provided by a mapping server, for example. Map data 126 includes various characteristics of a road such as road terrain information (e.g., grade, curvature, etc.) and road parameter information (e.g., speed limit, road length, etc.). In one embodiment, mapping module 110 generates a map using received waypoint data 122 and map data 126. The map can be in a grid format showing the various networks of roads, highways, bridges, etc. Mapping module 110 is also configured to obtain other mapping information such as charging locations 128 that indicate one or more sites to charge the electric vehicle, and ZEZ locations 130 that indicate one or more areas where access by vehicles with internal combustion engines is restricted or deterred with the aim of improving the air quality in the areas. In some embodiments, map data 126 includes charging locations 128 and ZEZ locations 130.

Vehicle condition module 112 is configured to obtain data associated with operating the electric vehicle such as dynamic operating characteristics 132 (e.g., speed, acceleration, yaw rate, wheel slip, braking event, etc.), vehicle state 134 (e.g., state of charge (SOC) of battery, vehicle age, maintenance information, etc.), and vehicle location 136 (e.g., latitude, longitude, etc.). Some or all of data 132-136 can be obtained or estimated using information communicated from vehicle device 102 and/or another device such as a fleet server.

Environment condition module 114 is configured to obtain data associated with the external environment of the electric vehicle such as road conditions 140 (e.g., road closures, constructions, etc.), traffic conditions 142 (e.g., congestions, detours, accidents, etc.), and weather conditions 144 (e.g., fog, snow, flood, etc.). Some or all of data 140-144 can be obtained from various databases that provide real-time information on road, traffic, and weather conditions.

Route calculation module 116 is configured to determine an optimal route for the electric vehicle to follow to visit or stop by each of the plurality of waypoints. Based on inputs from waypoints module 108, mapping module 110, vehicle condition module 112, environment module 114, and/or data repository 120, route calculation module 116 generates a plurality of route segments connecting each of the plurality of waypoints and calculates the optimal route by evaluating each of the plurality of route segments. Specifically, route calculation module 116 executes a searching algorithm to identify a route that minimizes a total energy consumed by the electric vehicle to travel the plurality of route segments while completing the visit to each of the plurality of waypoints within a target time. Any number of searching algorithms or methods can be used to find the optimal route including, but not limited to, genetic algorithms, simulated annealing algorithms, breadth-first algorithms, depth-first algorithms, best-first algorithms, Traveling Salesman-related algorithms, linear programming algorithms, and any combinations or modifications thereof. Moreover, any number of data structures can be used to implement the algorithms (e.g., graphs, trees, stacks, queues, etc.). Once the optimal route is determined, route calculation module 116 transmits the route information for the optimal route to the electric vehicle (e.g., vehicle device 102) via network 106. In some embodiments, route calculation module 116 transmits the calculated optimal route to another server or system (e.g., fleet server) for further optimization, integration, and/or storage.

Route calculation module 116 also monitors for changes in the inputs received from modules 108-114. For example, an updated waypoint prioritization data 124 (from waypoints module 108) may indicate a reprioritization of one or more of the waypoints, or an updated traffic condition 142 (from environment condition module 114) may indicate the occurrence of an accident along the optimal route. Accordingly, in response to these changes, route calculation module 116 recalculates the optimal route for the electric vehicle. In this regard, route calculation module 116 performs an online analysis to take into account real-time circumstances that may affect the current operation of the electric vehicle.

Communication module 118 facilitates the transmission of data within route planning server 104 (e.g., between modules 108-116), and between route planning server 104 and external devices (e.g., vehicle device 102). Data repository 120 includes one or more databases that can store any of data 122-144. For example, modules 108-114 may obtain their respective data from external sources and stored them in data repository 120 for later use. In addition to storing data 122-144, data repository 120 stores data generated by route calculation module 116 (e.g., the optimal route). While FIG. 1 shows data repository 120 as residing in route planning server 104, in other embodiments, data repository 120 may be located externally and accessible by route planning server via network 106.

Figure 2:
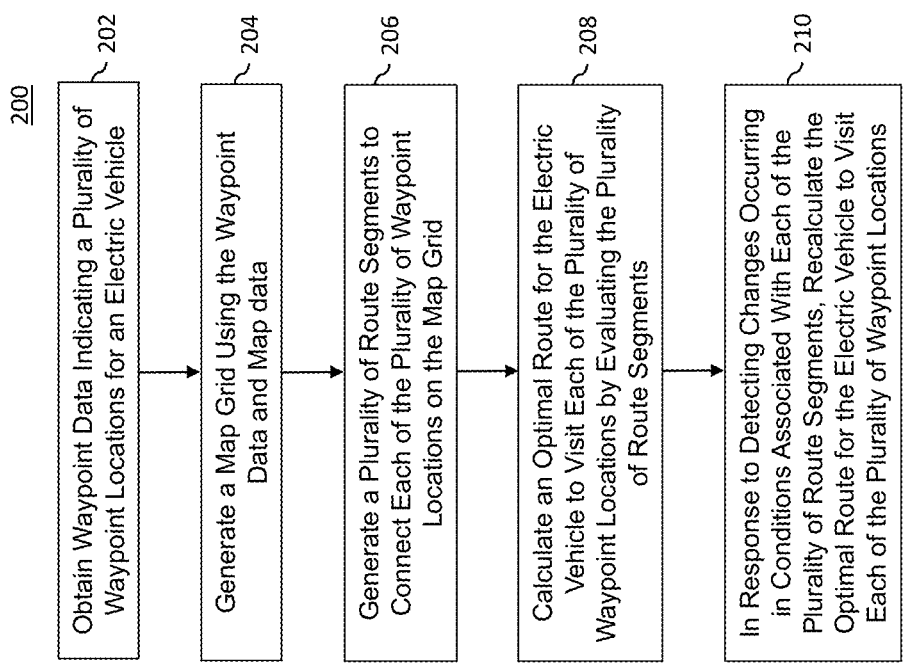
FIG. 2 is a flow chart illustrating a method of route planning for an electric vehicle.

Referring now to FIG. 2, a method 200 of route planning for an electric vehicle is shown. Method 200 can be performed by route planning server 104. At block 202, route planning server 104 obtains waypoint data (e.g., 122) indicating a plurality of waypoint locations for the electric vehicle. The waypoint locations are places that the electric vehicle needs to visit or stop by (e.g., to pick up or deliver a package). The waypoint data can be obtained from an external source such as a fleet server. In one example, route planning server 104 receives the waypoint data from the fleet server at a specific time (e.g., start of day). In another example, route planning server 104 communicates with the fleet server to retrieve the waypoint data. Route planning server 104 can also obtain waypoint prioritization data (e.g., 124), if available, that indicates priorities for the plurality of waypoint locations. For example, some waypoints may need to be visited in the morning (due to customer needs or demands) and thus would have higher priorities for the electric vehicle to stop by than those that do not need to be visited in the morning. Accordingly, route planning server 104 assigns priorities to the waypoint locations based on the waypoint prioritization data. The prioritization of the waypoint locations can be revised or updated as customer needs or demands change. Route planning server 104 can periodically receive or can actively monitor for changes in the waypoint prioritization data.

Figure 3:
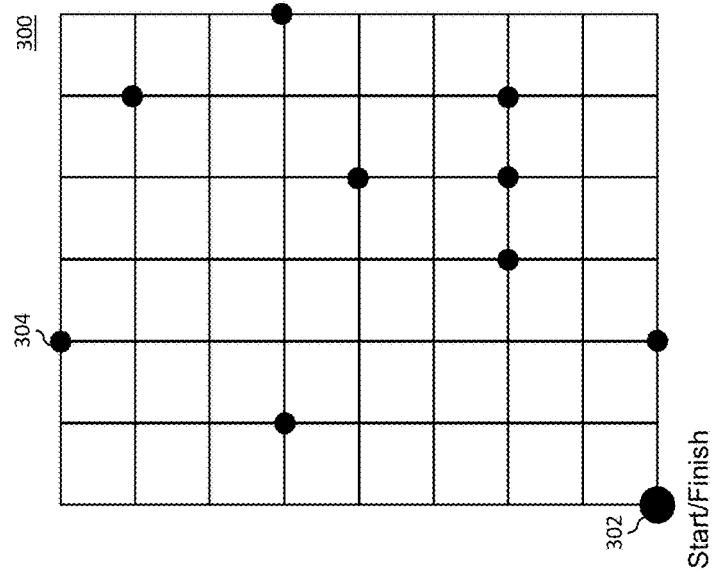

At block 204, route planning server 104 generates a map using the waypoint data and map data (e.g., 126). The map data can be obtained from an external source such as a mapping server. In one example, route planning server 104 determines the plurality of waypoint locations from the waypoint data and retrieves the map data corresponding to the areas surrounding the waypoint locations to generate the map. The plurality of waypoint locations can be displayed or overlaid on the map. As an illustration, FIG. 3 shows an example map or map grid 300 that includes a start/finish location 302 and a plurality of waypoint locations 304.

Figure 4:
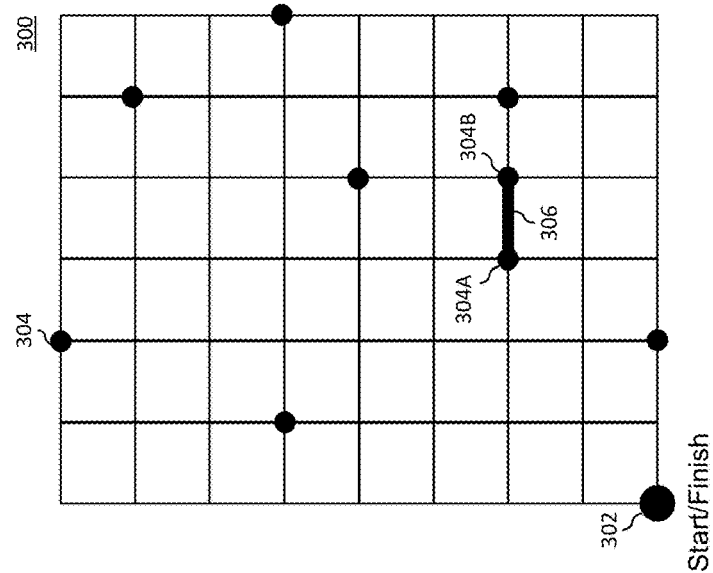

At block 206, route planning server 104 generates a plurality of route segments to connect each of the plurality of waypoint locations on the map. In one embodiment, route planning server 104 generates the plurality of route segments based on a prioritization of each of the plurality of waypoint locations as determined from the waypoint prioritization data. As an illustration, FIG. 4 shows an example route segment 306 that connects waypoints 304A and 304B on map 300. Route segment 306 has an associated length and an associated energy required to travel the length by the electric vehicle. Note that due to terrain variations such as slope or grade, the energy required to travel the length from 304A to 304B may be different from the energy required to travel the length from 304B to 304A, even though the total length is the same.

At block 208, route planning server 104 calculates an optimal route for the electric vehicle to visit each of the plurality of waypoint locations by evaluating the plurality of route segments. In evaluating the route segments, route planning server 104 executes a search algorithm to identify a route that minimizes a total energy consumed by the electric vehicle to travel the plurality of route segments while completing the visit to each of the plurality of waypoint locations within a target time. In one embodiment, minimizing the total energy includes route planning server 104 determining a length, a road characteristic (e.g., grade), and a speed limit for each of the plurality of route segments. The length, the road characteristic, and the speed limit can be determined from the map data obtained at block 204. Route planning server 104 then executes the search algorithm to identify a route that minimizes the total energy consumed by the electric vehicle to travel the length of each of the plurality of route segments based on dynamic operating characteristics (e.g., 132) of the electric vehicle, the road characteristic, and the speed limit for each of the plurality of route segments. For example, how often the electric vehicle brakes or accelerates can have an impact on the total energy consumed. In one embodiment, route planning server 104 executes the search algorithm by considering the energy required to travel the length of each of the plurality of route segments in both directions. For example, road terrain in different directions of travel (e.g., going uphill versus going downhill) can influence the total energy consumption.

Figure 5:
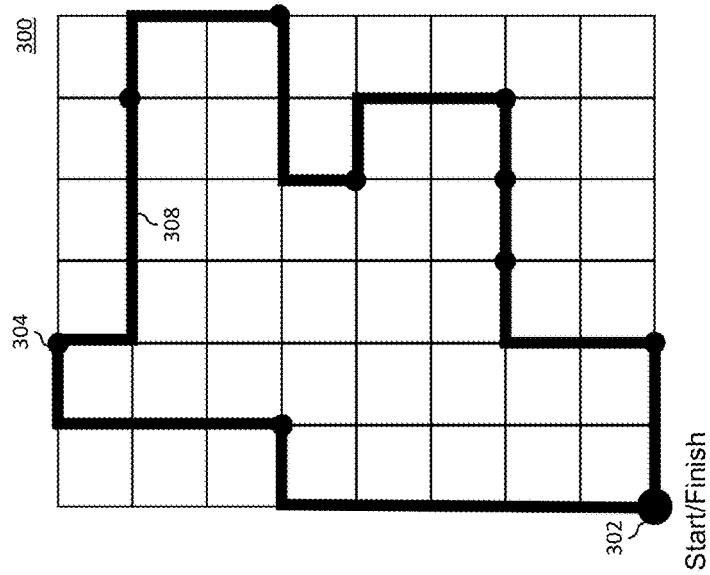
FIGS. 3-5 are conceptual diagrams illustrating route planning for an electric vehicle.

Minimizing the total energy consumed can further include route planning server 104 taking into consideration various conditions associated with each of the plurality of route segments such as road conditions (e.g., 140), traffic conditions (e.g., 142), and/or weather conditions (e.g., 144). For example, delays due to traffic or severe weather can impact energy consumption and whether all the waypoint locations can be visited on time. Moreover, minimizing the total energy consumed can include route planning server 104 taking into consideration a vehicle state (e.g., 134) of the electric vehicle. For example, battery life and wear-and-tear conditions on the electric vehicle can impact how energy will be consumed and whether the mission to visit all the waypoint locations can be completed. Moreover, the speed limit for each of the plurality of route segments may be based on either a marked speed limit or an effective speed limit due to the road conditions and/or the traffic conditions. As an illustration, FIG. 5 shows an example optimal route 308 for the electric vehicle to visit each of the plurality of waypoint locations 304 on map 300. Once the optimal route has been calculated, route planning server 104 can transmit the optimal route to the electric vehicle.

At block 210, in response to detecting changes occurring in the conditions associated with each of the plurality of route segments, route planning server 104 recalculates the optimal route for the electric vehicle to visit each of the plurality of waypoint locations. In one embodiment, the recalculation of the optimal route is in response to a reprioritization of each of the plurality of waypoint locations. Generally, recalculation may be carried out in response to changes occurring in any of the search parameters used to determine the optimal route. Further, route planning server 104 monitors whether the conditions associated with each of the plurality of route segments have changed. The conditions may include one or more of a road condition, a traffic condition, and a weather condition. In some embodiments, blocks 202-208 are executed offline (i.e., computed in advance), while block 210 is executed online or in real-time. In other embodiments, all blocks 202-210 are executed in real-time.

Figure 8:
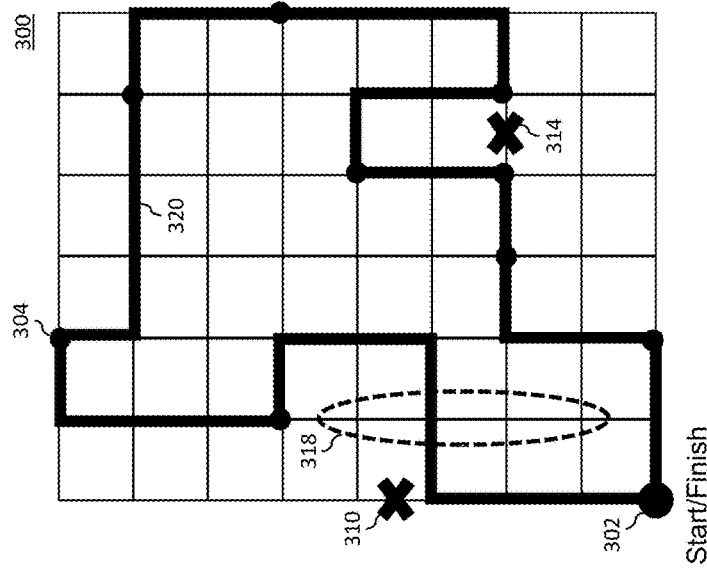
FIGS. 6-8 are conceptual diagrams illustrating route planning for a vehicle in view of changing conditions.
Figure 7:
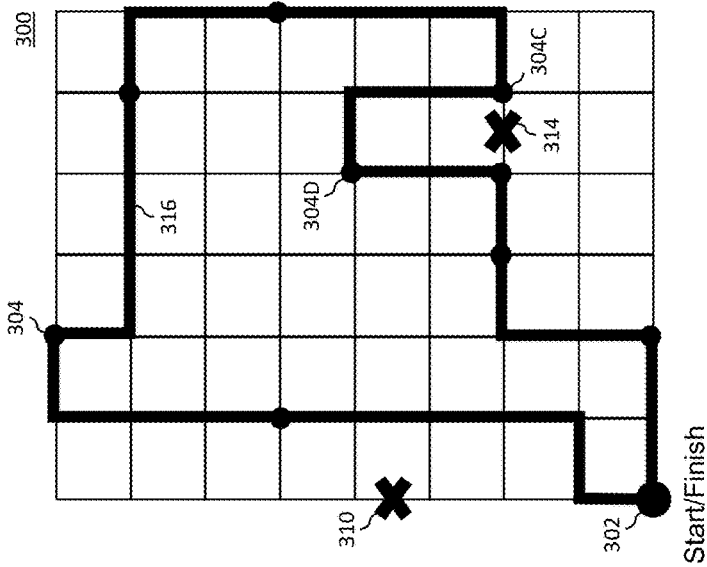
Figure 6:
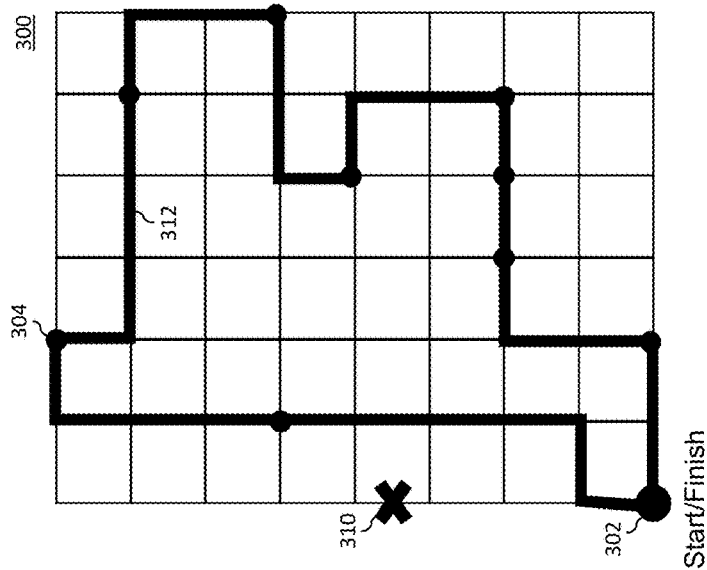

FIGS. 6-8 illustrate examples of route recalculation due to changing conditions. In FIG. 6, a disruption (e.g., a road closure) occurs at a location 310 along optimal route 308 on map 300 (see FIG. 5). As a result, route planning server 104 recalculates a reoptimized route 312 that avoids the disruption at location 310. In FIG. 7, in addition to the disruption at location 310, route planning server 104 receives a reprioritization notice 314 that swaps the priority between waypoints 304C and 304D on map 300. As a result, route planning server 104 recalculates an reoptimized route 316 that redirects the electric vehicle to visit waypoint 304D before visiting waypoint 304C. In FIG. 8, in addition to the disruption at location 310 and reprioritization notice 314, route planning server 104 determines or receives information of an adverse region 318 on map 300. Adverse region 318 may be a region or area with congested traffic, heavy construction, difficult terrain (e.g., heavier grade), etc. As such, transiting through adverse region 318 would cause either an excessive or an unacceptable use of energy. As a result, route planning server 104 recalculates an reoptimized route 320 that avoids traveling through adverse region 318 as much as possible.

In scenarios where the electric vehicle is a pure electric vehicle, additional factors such as charging locations (e.g., 128) may be considered in calculating the optimal route. Here, the onboard energy storage system (e.g., battery) of the electric vehicle may be designed to be smaller, but the electric vehicle must pick up energy along the way at the appropriate charging locations. In one embodiment, the map data obtained at block 204 includes charging locations for the electric vehicle. As such, generating the plurality of route segments at block 206 includes generating route segments that connect each of the plurality of waypoint locations in view of the charging locations. Similarly, calculating the optimal route by evaluating the plurality of route segments at block 208 includes minimizing a total energy consumed by the electric vehicle to travel the plurality of route segments while considering the charging opportunities available at the charging locations and completing the visit to each of the plurality of waypoint locations within a target time.

Figure 9:
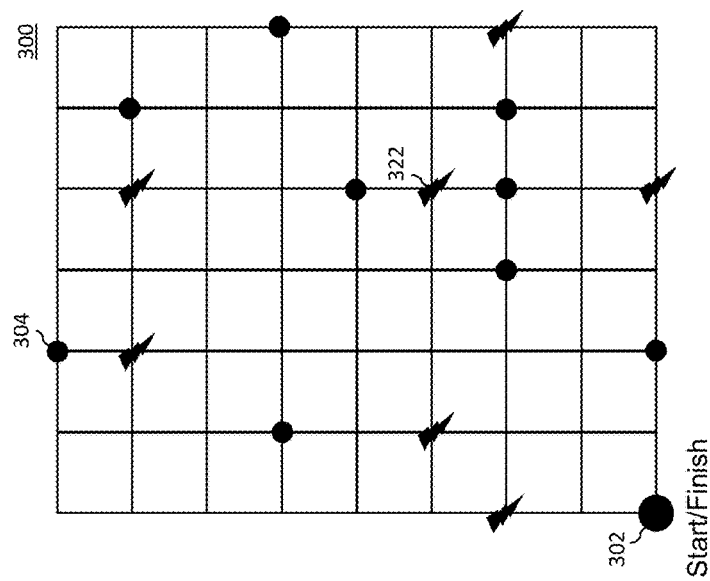

As an illustration, FIG. 9 shows map 300 with example charging locations 322 along with the plurality of waypoint locations 304. The objective is to find an optimal route that will minimize the total energy used by the electric vehicle while factoring in the charging locations and charging times needed to complete the mission on time. The calculated optimal route in FIG. 9 may not be the same as optimal route 308 in FIG. 5. Also, there will be more energy consumed by the electric vehicle operating in the environment of FIG. 9 because the electric vehicle will need to make one or more detours to pick up the needed energy along the way.

Figure 10:
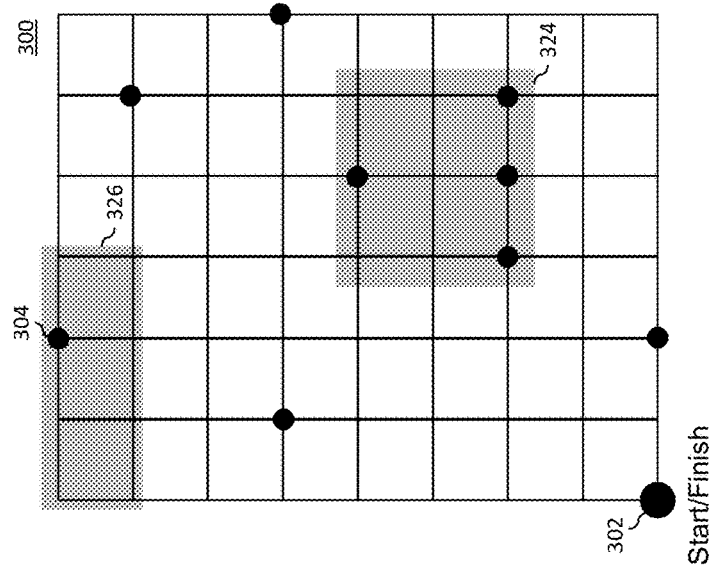

In scenarios where the electric vehicle is a hybrid or plug-in vehicle, additional factors such as ZEZ locations (e.g., 130) may be considered in calculating the optimal route. In urban environments, ZEZs restrict or deter vehicles with internal combustion engines from entering. As such, a hybrid or plug-in vehicle will need to run in electric mode when transiting through a ZEZ. Generally, ZEZs can be developed from corporate initiatives or government regulations. As one example, competitive pressures may force delivery companies to treat certain regions of their delivery (e.g., residential neighborhoods, school zones, hospital zones, highly congested districts, etc.) as ZEZs. In doing so, the delivery companies can be seen as promoting corporate sustainability goals to their customers. As another example, countries around the world are increasingly considering legislation to create ZEZs to promote cleaner air in their cities. Once developed in a city, ZEZs are expected to vary in size and location and be intermixed with other non-ZEZs. As an illustration, FIG. 10 shows map 300 with example ZEZs 324, 326 along with the plurality of waypoint locations 304.

In one embodiment, the map data obtained at block 204 includes ZEZ locations. As such, generating the plurality of route segments at block 206 includes generating route segments that connect each of the plurality of waypoint locations in view of the ZEZ locations. Similarly, calculating the optimal route by evaluating the plurality of route segments at block 208 includes minimizing a total energy consumed by the electric vehicle to travel the plurality of route segments while considering the requirements of traveling through the ZEZ locations and completing the visit to each of the plurality of waypoint locations within a target time. The requirements of traveling through the ZEZ locations include the priorities of the ZEZ locations (e.g. some zones must come before or after others), charging the electric vehicle prior to entering the ZEZ locations, and/or the emissions footprint created.

In one example, determining the optimal route involves allowing the onboard energy storage system (e.g., battery) of the electric vehicle to be fully charged prior to entering a ZEZ such that the electric vehicle is able to adequately complete the mission through the ZEZ. Not only does this consider the order of stops through a given ZEZ, but also the order/path that the electric vehicle approaches each ZEZ. The objective is to find an optimal route that will minimize the total energy used by the electric vehicle while factoring in constraints associated with recharge costs (with no extra recharge energy left over) and emissions footprint (target $CO_2$ emissions). Other factors to consider may include the time of day as some zones may only be ZEZ during certain times of the day and thus must be traversed during specific time windows.

Figure 11:
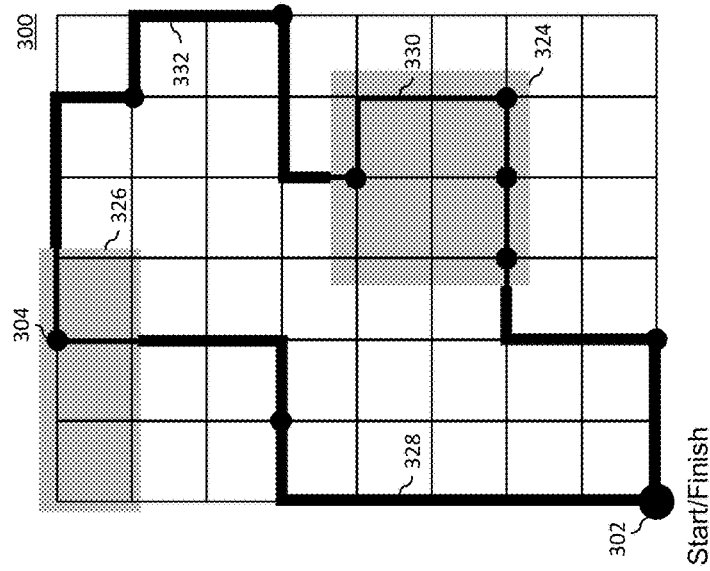
FIGS. 9-11 are conceptual diagrams illustrating route planning for a vehicle in view of charging locations and ZEZ locations.

As an illustration, FIG. 11 shows an example optimal route 328 for the electric vehicle to visit each of the plurality of waypoint locations 304 in view of traveling through ZEZs 324, 326 on map 300. In particular, optimal route 328 has a leg 330 that transits through ZEZ 324 and a leg 332 that falls outside of ZEZ 324. Leg 330 is calculated in view of the recharge cost to travel through ZEZ 324 and the requirements of ZEZ 324 such as level of $CO_2$ emissions.

As described herein, route planning server 104 optimizes route planning for an electric vehicle or a fleet of electric vehicles by minimizing energy usage, exploiting charging opportunities, and meeting any ZEZ requirements.

The various illustrative modules and logical blocks described in connection with the embodiments disclosed herein can be implemented or performed by a machine, such as a general-purpose processor (e.g., a microprocessor, a microcontroller, a state machine, etc.), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. Alternatively, the storage medium can be integral to the processor.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of route planning for a fleet of electric vehicles, the method comprising:
   obtaining, by a computing device, waypoint data indicating a plurality of waypoint locations for each electric vehicle of the fleet;
   generating, by the computing device, a plurality of route segments to connect each of the plurality of waypoint locations on a map;
   calculating, by the computing device, an optimal route for each electric vehicle of the fleet, wherein calculating the optimal route includes minimizing a total energy consumed by each electric vehicle of the fleet to travel a total length of each of the plurality of route segments in both directions based on (i) dynamic operating characteristics comprising braking and acceleration of each electric vehicle of the fleet and (ii) a speed limit of each of the plurality of route segments;
   analyzing a prioritization associated with each of the plurality of waypoint locations to connect the plurality of waypoint locations together;
   presenting, by the computing device, the calculated optimal route to each electric vehicle of the fleet to navigate to each of the plurality of waypoint locations;
   determining, by the computing device, whether real-time changes have occurred in conditions associated with each of the plurality of route segments during operations of each electric vehicle of the fleet;
   in response to determining that real-time changes have occurred in the conditions associated with each of the plurality of route segments, recalculating, by the computing device, the optimal route for each electric vehicle of the fleet based on the real-time changes that have occurred in the conditions associated with each of the plurality of route segments;
   presenting, by the computing device, the recalculated optimal route to each electric vehicle of the fleet to navigate to each of the plurality of waypoint locations; and
   generating the map to display the plurality of waypoint locations using the waypoint data and map data, wherein:
   the map data includes zero emission zone (ZEZ) locations;
   generating the plurality of route segments includes connecting each of the plurality of waypoint locations in view of the ZEZ locations; and
   calculating the optimal route includes minimizing the total energy consumed by each electric vehicle of the fleet to travel the plurality of route segments while considering requirements of traveling through the ZEZ locations and completing a visit to each of the plurality of waypoint locations within a target time, the requirements of traveling through the ZEZ locations including priorities of the ZEZ locations.

2. The method of claim 1, wherein minimizing the total energy is further based on completing a visit to each of the plurality of waypoint locations within a target time.

3. The method of claim 2, wherein minimizing the total energy further includes:
   determining the dynamic operating characteristics;
   determining the speed limit of each of the plurality of route segments; and
   determining road characteristics of each of the plurality of route segments.

4. The method of claim 3, wherein minimizing the total energy is further based on the conditions associated with each of the plurality of route segments, the conditions including one or more of a road condition, a traffic condition, and a weather condition.

5. The method of claim 4, wherein the speed limit of each of the plurality of route segments is based on a marked speed limit or an effective speed limit due to one or more of the road condition and the traffic condition.

6. The method of claim 3, wherein minimizing the total energy is further based on a state of each electric vehicle of the fleet.

7. The method of claim 1, wherein generating the plurality of route segments to connect each of the plurality of waypoint locations on the map is based on the prioritization associated with each of the plurality of waypoint locations.

8. The method of claim 1, wherein recalculating the optimal route is further in response to a reprioritization associated with each of the plurality of waypoint locations.

9. The method of claim 1, further comprising generating the map to display the plurality of waypoint locations using the waypoint data and map data, wherein:
- the map data includes charging locations for each electric vehicle of the fleet;
- generating the plurality of route segments includes connecting each of the plurality of waypoint locations in view of the charging locations; and
- calculating the optimal route further includes minimizing the total energy consumed by each electric vehicle of the fleet to travel the plurality of route segments while considering charging opportunities at the charging locations and completing a visit to each of the plurality of waypoint locations within a target time.

10. A computing device comprising:
- a processor; and
- a memory including instructions that, when executed by the processor, cause the processor to:
  - obtain waypoint data indicating a plurality of waypoint locations for a fleet of electric vehicles;
  - generate a plurality of route segments to connect each of the plurality of waypoint locations on a map;
  - calculate an optimal route for each electric vehicle of the fleet, wherein calculating the optimal route includes minimizing a total energy consumed by each electric vehicle of the fleet to travel a total length of each of the plurality of route segments in two directions, the two directions including:
    - a first direction comprising uphill travel, and
    - a second direction opposite the first direction comprising downhill travel; and
  - analyzing a prioritization associated with each of the plurality of waypoint locations to connect the plurality of waypoint locations together;
  - present the calculated optimal route to each electric vehicle of the fleet to navigate to each of the plurality of waypoint locations;
  - determine whether real-time changes have occurred in conditions associated with each of the plurality of route segments during operations of each electric vehicle of the fleet;
  - in response to determining that real-time changes have occurred in the conditions associated with each of the plurality of route segments, recalculate the optimal route for each electric vehicle of the fleet based on the real-time changes that have occurred in the conditions associated with each of the plurality of route segments;
  - present the recalculated optimal route to direct each electric vehicle of the fleet to navigate to each of the plurality of waypoint locations;
  - generate the map to display the plurality of waypoint locations using the waypoint data and map data, the map data including zero emission zone (ZEZ) locations;
  - generate the plurality of route segments to connect each of the plurality of waypoint locations in view of the ZEZ locations; and
  - calculate the optimal route by minimizing the total energy consumed by each electric vehicle of the fleet to travel the plurality of route segments while considering a time window during which a zone is a ZEZ.

11. The computing device of claim 10, wherein the instructions that cause the processor to minimize the total energy further comprise instructions that cause the processor to minimize the total energy based on completing a visit to each of the plurality of waypoint locations within a target time.

12. The computing device of claim 11, wherein the instructions that cause the processor to minimize the total energy further comprise instructions that cause the processor to:
- determine dynamic operating characteristics of each electric vehicle of the fleet;
- determine a speed limit of each of the plurality of route segments; and
- determine road characteristics of each of the plurality of route segments.

13. The computing device of claim 12, wherein the instructions that cause the processor to minimize the total energy further comprise instructions that cause the processor to minimize the total energy based on the conditions associated with each of the plurality of route segments, the conditions including one or more of a road condition, a traffic condition, and a weather condition.

14. The computing device of claim 13, wherein the speed limit of each of the plurality of route segments is based on a marked speed limit or an effective speed limit due to one or more of the road condition and the traffic condition.

15. The computing device of claim 12, wherein the instructions that cause the processor to minimize the total energy further comprise instructions that cause the processor to minimize the total energy based on a state of each electric vehicle of the fleet.

16. The computing device of claim 10, wherein the instructions that cause the processor to generate the plurality of route segments to connect each of the plurality of waypoint locations on the map further comprise instructions that cause the processor to generate the plurality of route segments based on the prioritization associated with each of the plurality of waypoint locations.

17. The computing device of claim 10, wherein the instructions that cause the processor to recalculate the optimal route further comprise instructions that cause the processor to recalculate the optimal route in response to a reprioritization associated with each of the plurality of waypoint locations.

18. The computing device of claim 10, wherein the instructions when executed by the processor, further cause the processor to:
- generate the map to display the plurality of waypoint locations using the waypoint data and map data, the map data including charging locations for each electric vehicle of the fleet;
- generate the plurality of route segments to connect each of the plurality of waypoint locations in view of the charging locations; and
- calculate the optimal route by minimizing the total energy consumed by each electric vehicle of the fleet to travel the plurality of route segments while considering charging opportunities at the charging locations and completing a visit to each of the plurality of waypoint locations within a target time.

19. A method of route planning for a fleet of electric vehicles, the method comprising:
- obtaining, by a computing device, waypoint data indicating a plurality of waypoint locations for the fleet;
- generating, by the computing device, a plurality of route segments to connect each of the plurality of waypoint locations on a map;
- calculating, by the computing device, an optimal route for each electric vehicle of the fleet, wherein calculating the optimal route includes minimizing a total energy consumed by each electric vehicle of the fleet to travel a total length of each of the plurality of route segments in two directions, the two directions including:
a first direction comprising uphill travel, and
a second direction opposite the first direction comprising downhill travel; and
analyzing a prioritization associated with each of the plurality of waypoint locations to connect the plurality of waypoint locations together;
presenting, by the computing device, the calculated optimal route to each electric vehicle of the fleet to navigate to each of the plurality of waypoint locations;
determining, by the computing device, whether real-time changes have occurred in conditions associated with each of the plurality of route segments during operations of each electric vehicle of the fleet;
in response to determining that real-time changes have occurred in the conditions associated with each of the plurality of route segments, recalculating, by the computing device, the optimal route for each electric vehicle of the fleet based on the real-time changes that have occurred in the conditions associated with each of the plurality of route segments;
presenting, by the computing device, the recalculated optimal route to direct each electric vehicle of the fleet to navigate to each of the plurality of waypoint locations;
generating the map to display the plurality of waypoint locations using the waypoint data and map data, the map data including zero emission zone (ZEZ) locations;
generating the plurality of route segments to connect each of the plurality of waypoint locations in view of the ZEZ locations; and
calculating the optimal route by minimizing the total energy consumed by each electric vehicle of the fleet to travel the plurality of route segments while considering a time window during which a zone is a ZEZ.

20. The method of claim 19, wherein minimizing the total energy is further based on completing a visit to each of the plurality of waypoint locations within a target time.

* * * * *